Patented Nov. 8, 1932

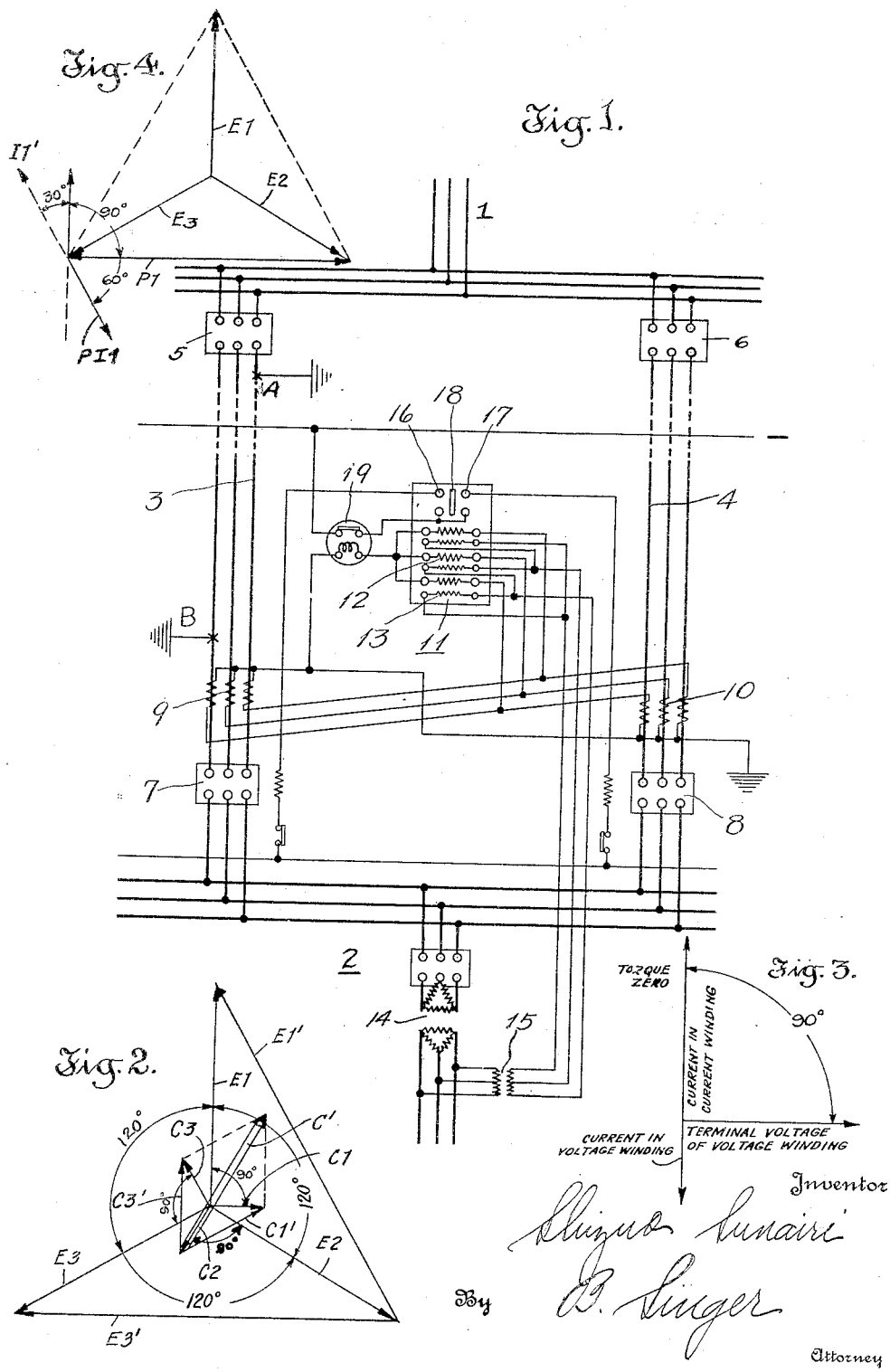

1,886,986

UNITED STATES PATENT OFFICE

SHIZUO SUNAIRI, OF HIROSHIMA-SHI, JAPAN

PROTECTIVE RELAY SYSTEM

Application filed August 22, 1928, Serial No. 301,405, and in Japan December 13, 1927.

My invention relates to improvements in protective relay systems, and more especially a protective system adapted for use in a grounded neutral system including a high resistance to a ground or non-grounded system and the ground current of which is faulty and is often lower than the load current as in a system with its neutral non-grounded or grounded through a high resistance.

One object of my invention is to provide improved means at the sending end for selecting and interrupting a grounded circuit and protecting the other circuit from damages.

Another object of my invention is to provide a method to enable a protective relay system to correctly select the grounded circuit and interrupting the same without failure at the sending end.

Another object of my invention is to provide means for preventing unbalanced load current from falsely actuating the ground protection system.

A further object of my invention is to provide means for obtaining potential elements in a directional power relay for the ground protection, from the low tension side of a power station.

There are other objects of my invention, which together with the foregoing will appear in the following description.

In the accompanying drawing

Figure 1 is a diagram of circuits and apparatus embodying my invention.

Figures 2, 3 and 4 are vector diagrams.

When double-circuits high tension transmission systems have their neutral dead grounded, there will be no considerable difficulty in selectively protecting the lines from grounding, because a large short-circuit current will flow in the grounded circuit and is sufficient to operate a relay for tripping the proper circuit interrupter. If, however, the power system has no neutral grounded or a neutral grounded through a high resistance, as desirable under a certain condition, a ground current of the limited low value will flow through the grounding circuit.

When one phase is grounded by fault, in a three phase transmission line with its neutral grounded through a high limiting resistance, the ground current flowing through the faulty point is the sum of the dynamic current in the limiting resistance and the charging current of the transmission line to the earth. In a transmission line of about 55 k. v. or higher, the limiting resistance is usually the order of some hundred ohms so that the dynamic current may be limited to a low value, say 40 amperes, and since the reactances of the line, power transformers, generators, etc., are negligible, this dynamic current has substantially a unity power factor.

The charging currents of a three phase transmission line balance among the phases, and their vectorial sum is zero under the normal condition. Should one phase be grounded by fault, the charging current in the grounded phase would become zero, while those in the other two phases increase to $\sqrt{3}$ times their normal values, respectively. The vectorial sum of the charging currents in the two phases thus increases to three times the normal value of one phase, and this large charging current concentrates to the grounded point of the faulty phase.

Referring to Figure 2, E1, E2, E3 represent the line voltage of each phase to the ground, and C1, C2, C3 represent the normal charging current in each line. When one phase, say line E2, is grounded, the voltage of the other two lines increase to E1′ and E3′, respectively, and the charging current in lines E3 and E1 increase accordingly, as they are substantially proportional to the voltage of the lines respectively. C1′ and C3′ represent the charging current thus increased. The vectorial sum of them is represented by C′ which has a length three times the vector C1, C2 or C3. When a ground occurs on one of the lines, the resultant line voltage E2—E3 does not exactly become E3′, because of the existence of faulty ground current flowing through the fault. However, on a non-grounded system, such faulty ground current is so small that any distortion of the triangle of the vectors may be neglected for the purpose of the present explanation, and the proposed vector diagram is appropriately obtained. On a grounded system through a high resistance such as covered by the present invention, the resistance is so high that faulty ground current may be neglected as in the case of non-grounded system above-explained, as far as the vector diagram is concerned.

In a 55 k. v., three-phase transmission line with its neutral grounded through a limiting resistance of 800 ohms, experiments have shown that, under line voltage of 52,000 volts, dynamic current of 35 amperes and charging current of 59 amperes flow through the grounded point of the faulty phase, the resultant current being of 69 amperes with a leading angle of 59 degrees. In a transmission system with no neutral grounded, the ground current consists of the above-mentioned charging current only which is leading substantially 90 degrees in phase.

Thus, the ground current is always leading in phase by more than about 50 degrees, while the load current is usually lagging and rarely leading by less than about 20 to 30 degrees.

According to my invention, I propose to utilize the above-mentioned leading characteristics of the ground current, and a directional power relay is used at the sending end of the system, in which relay the potential windings are normally energized in accordance with the phase voltages of the low tension side of the system, while the current elements are energized in accordance with the unbalance between the two circuits. The relay is so arranged and connected to the system that the movable contact member is actuated to one direction when line current leads line voltage by any angle larger than a predetermined degree, such as 30 degrees, which is determined by the relative values of the above-mentioned leading ground current and the load current, while it is actuated to the opposite direction when the current does not lead so far. Consequently, with line current leading line voltage by 30 degrees, for example, the torque becomes zero. It will be obvious to those skilled in the art that such an arrangement of a directional power relay can be obtained within mechanical skill, and needs no particular illustration therefor.

In an ordinary watt-hour meter type relay, the torque is maximum when the voltage and current are in phase with each other, that is to say, the current in voltage winding is made to lag the terminal voltage thereof by 90 degrees, that is to say, the power factor of voltage winding circuit is made zero. Consequently, the torque is maximum when the current in current winding is in phase with the terminal voltage of voltage winding, as the torque is maximum when the current flux and voltage flux have 90 degrees phase difference with each other. Therefore, the torque is zero when the current in current winding and the terminal voltage of voltage winding have 90 degrees phase difference.

In the present invention, the power factor of voltage winding circuit is not made zero, but has a suitable substantial value, and by proper selection of the power factor, the relay is made to have its torque zero when line current of the system leads line voltage by a certain angle. With the connection of the relay 11 shown in the drawing, a vector diagram for the relay is given in Figure 4, wherein P1 represents the voltage impressed on the voltage winding of one phase, which is the line-to-line voltage of the system, while I1 represents the current in the current winding of the same phase, which is in phase with the line current. According to the invention, assume that the power factor of voltage winding circuit is made 0.5, that is to say, the current therein lags the terminal voltage by 60 degrees. PI1 then represents the current in voltage winding. The torque will be zero when I1 and PI1 are in phase or in opposite phase with each other. This condition occurs when I1 is shifted forward by 30 degrees and takes the position of I1', and this signifies that the line current I1 leads the line phase voltage E1 by 30 degrees.

Referring now to the drawing, wherein Figure 1 is a diagram of circuits and apparatus embodying my invention, a substation 1 receives alternating current electrical power from a power station 2, by way of a double-circuit high tension transmission line, comprising two circuits 3 and 4, including circuit interrupters 5 and 6 at the receiving end, and circuit interrupters 7 and 8 at the sending end, respectively. The neutral point of the system 2 is not grounded, or alternately it may be grounded through a high limiting resistance as hereinbefore described. But it will not be necessary to illustrate this grounding resistance, because such an arrangement may be readily understood.

With the sending ends of the respective circuits are associated current transformers 9 and 10, whose secondaries are differentially or oppositely connected for respective corresponding phases, with their star points grounded, and energize a directional power relay 11.

The relay 11 comprises current windings 12 connected between respective phases of the current transformers and the ground, and potential windings 13 energized in accordance with the phase voltages at the power station. The potential windings may be conveniently energized from the low tension side of the main transformers 14, through a potential transformer 15, if necessary. With this arrangement, considerable expenses in providing a high tension potential transformer may be avoided.

The directional power relay also comprises two opposed pairs of contacts 16 and 17 controlled by an armature 18 carrying a movable contact, for selectively engaging the contacts 16 and 17 in accordance with the energization of the actuating windings 12 and 13. The contacts 16 and 17 control the tripping circuits of the respective circuit interrupters 7 and 8.

A ground current relay 19 is included in the grounding circuit of the current windings 12, and comprises a movable armature for controlling the common return of the tripping circuits.

When normal, the load currents in respective circuits 3 and 4 balance with each other and no current flows through the relays 11 and 19.

In order to provide a better understanding of the invention, I will now describe the operation of selective protection which takes place in case of one circuit grounded.

Now assume that one line of the circuit 3 is grounded by fault while the other circuit 4 is normal. An unbalanced current will then flow through the current windings 12 and the winding of the ground current relay 19 to the ground, and energize them. The armature 18 is then actuated in the direction to engage the contacts 16, and energize the tripping circuit of the circuit interrupter 7, the circuit being completed through the contacts of the energized relay 19. The interrupter 7 is thus tripped to its open position selectively in response to the grounding of the associated circuit 3.

By some reason, such as in the case that the grounding would have occurred at a point A adjacent to the receiving end, it would happen that the circuit interrupter 5 is first tripped before the proper interrupter 7 is open. In this case, the whole load is transferred to the other circuit 4, increasing its load current, while in the grounded circuit 3 flows the leading ground current hereinbefore described.

Under the circumstances, due to the special arrangement and setting of the relay 11, as hereinbefore described, both the lagging current in the circuit 4 and the leading current in the circuit 3, function to actuate the armature 18 in one and the same direction so as to complete the tripping circuit of the proper interrupter 7.

When a grounding occurs at a point B near the sending end, the differential current in the relay windings 12 is maximum and is leading in phase due to the leading ground current, the load currents in both circuits being balanced with each other. The armature 18 is then actuated to close the contacts 16, and the proper circuit interrupter 7 is tripped without failure.

Although I have shown only one embodiment of my invention, it will be readily understood that various modifications and changes are possible, and I do not intend to limit myself by the specific disclosure but only insofar as set forth in the appended claims.

I claim as my invention:

1. In a protective relay system adapted for use in a grounded neutral system including a high resistance to ground or a non-grounded system, a power station, a circuit interrupter having a tripping coil for cutting out said line from the power station end, a directional power relay for controlling the circuit of said tripping coil of said interrupter, said relay comprising a contact-carrying movable armature which is actuated in one direction, in accordance with the ground current when said line is grounded, so as to prepare the tripping circuit, and is actuated in the opposite direction in response to load current in said line, and a current relay energized by said ground current for completing said tripping circuit.

2. In a protective relay system, adapted for use in a grounded neutral system including a high resistance to ground or a non-grounded system, and comprising a substation, a power station, two circuits connecting said substation and said power station, means for interrupting said two circuits at the power station end, and a directional power relay at the power station end for controlling said interrupting means and comprising current elements energized in accordance with the unbalance between said two circuits and potential elements energized in accordance with the normal phase voltages of the power station line, said relay being so arranged that the torque thereof reverses its direction when the line current leads the phase voltage by a predetermined degree.

3. In a protective relay system, adapted for use in a grounded neutral system including a high resistance to ground or a non-grounded system, and comprising a substation, a power station, two circuits connecting said substation and said power station, means for interrupting said two circuits at the power station end, a directional power relay for selectively controlling said interrupting means in accordance with leading current which flows in one circuit when it is grounded by fault, and a ground current relay in series with said directional power relay.

4. In a protective relay system, adapted for use in a grounded neutral system including a high resistance to ground or a non-grounded system, and comprising a substation, a power station, two circuits connecting said substation and said power station, a directional power relay comprising a plurality of current windings energized in accordance with the unbalance between respective corresponding phases of said two circuits, a plurality of potential windings energized in accordance with the respective phase voltages of the power station side, and a movable armature actuated thereby, said relay being so arranged that the actuating torque is zero when the line current leads the phase voltage by a predetermined degree.

In witness whereof I affix my signature.

SHIZUO SUNAIRI.